(12) United States Patent
Li et al.

(10) Patent No.: US 11,462,880 B2
(45) Date of Patent: Oct. 4, 2022

(54) DISTRIBUTED PULSED LIGHT AMPLIFIER BASED ON OPTICAL FIBER PARAMETER AMPLIFICATION, AND AMPLIFICATION AND PERFORMANCE CHARACTERIZATION METHOD

(71) Applicant: Wuhan University of Technology, Wuhan (CN)

(72) Inventors: Zhengying Li, Wuhan (CN); Xuelei Fu, Wuhan (CN); Ben Xiong, Wuhan (CN); Zhou Zheng, Wuhan (CN)

(73) Assignee: Wuhan University of Technology, Wuhan (CN)

( * ) Notice: Subject to any disclaimer, the term of this patent is extended or adjusted under 35 U.S.C. 154(b) by 0 days.

(21) Appl. No.: 17/583,285

(22) Filed: Jan. 25, 2022

(65) Prior Publication Data

US 2022/0149584 A1    May 12, 2022

Related U.S. Application Data

(63) Continuation of application No. PCT/CN2021/120470, filed on Sep. 24, 2021.

(30) Foreign Application Priority Data

Aug. 28, 2020  (CN) .......................... 202010888238.8

(51) Int. Cl.
*H01S 3/10* (2006.01)
*G01M 11/00* (2006.01)
(Continued)

(52) U.S. Cl.
CPC ..... *H01S 3/10015* (2013.01); *G01M 11/3109* (2013.01); *G02F 1/395* (2013.01); *H01S 3/094076* (2013.01); *H01S 3/302* (2013.01)

(58) Field of Classification Search
None
See application file for complete search history.

(56) References Cited

U.S. PATENT DOCUMENTS

| 2008/0068586 | A1* | 3/2008 | Kishida | ................ G01L 1/242 |
| | | | | 374/E11.015 |
| 2009/0079967 | A1* | 3/2009 | Radic | ................. G01M 11/39 |
| | | | | 356/73.1 |

(Continued)

FOREIGN PATENT DOCUMENTS

| CN | 201853937 U | 6/2011 |
| CN | 202854463 U | 4/2013 |

(Continued)

OTHER PUBLICATIONS

Hansryd et al. Fiber-Based Optical Parametric Amplifiers and Their Applications, IEEE Journal of selected topics in Quantum Electronics, vol. 8, No. 3, pp. 506-520. (Year: 2002).*

(Continued)

*Primary Examiner* — Eric L Bolda

(57) ABSTRACT

The present invention discloses a distributed pulsed light amplifier based on optical fiber parametric amplification, comprising a pump pulsed light source, a sensing pulsed light source, a synchronization device, a two-in-one optical coupler, an optical circulator, a parametric amplification optical fiber, a first optical filter, a photoelectric detector and a signal acquisition device. According to the distributed pulsed light amplifier, high-power pulsed light is used as pump light to generate an optical fiber parametric amplification effect near a zero-dispersion wavelength of an optical fiber, thereby amplifying a power of another sensing pulsed light. Meanwhile, due to the fact that effective optical fiber parametric amplification cannot be achieved through low-power light leakage outside a duration interval of the pump pulsed light, leaked light from the sensing pulsed light (Continued)

cannot be amplified, and the effect of amplifying a pulse extinction ratio can be achieved at the same time.

8 Claims, 3 Drawing Sheets

(51) Int. Cl.
  *G02F 1/39* (2006.01)
  *H01S 3/094* (2006.01)
  *H01S 3/30* (2006.01)

(56) References Cited

U.S. PATENT DOCUMENTS

| | | | |
|---|---|---|---|
| 2011/0228255 A1* | 9/2011 | Li | G01B 11/18 356/32 |
| 2014/0152982 A1* | 6/2014 | Gosteli | G01N 21/8806 356/300 |
| 2021/0262892 A1* | 8/2021 | Iida | H04B 10/071 |

FOREIGN PATENT DOCUMENTS

| | | |
|---|---|---|
| CN | 204630588 U | 9/2015 |
| CN | 107154575 A | 9/2017 |
| CN | 110515255 A | 11/2019 |
| KR | 20200042705 A | 4/2020 |

OTHER PUBLICATIONS

Olsson et al. "OTDR Technique for Characterization of Fiber Optic Parametric Amplifiers" 2006 Optical Fiber Communication Conference and the National Fiber Optic Engineers Conference (Year: 2006).*

Journal Title: "China Excellent Master's Thesis Full-text Database Information Technology Series" Issue: S2 Issue date: Dec. 15, 2011 author: Chuan Zhao title: "Study on Optical Parametric Amplifier Based on High Nonlinear Fiber".

* cited by examiner

DISTRIBUTED PULSED LIGHT AMPLIFIER BASED ON OPTICAL FIBER PARAMETER AMPLIFICATION, AND AMPLIFICATION AND PERFORMANCE CHARACTERIZATION METHOD

CROSS-REFERENCE TO RELATED APPLICATIONS

The application claims priority to Chinese patent application No. 202010888238.8, filed on Aug. 28, 2020, the entire contents of which are incorporated herein by reference.

TECHNICAL FIELD

The present invention relates to the technical field of optical sensing, and more particularly, to a distributed pulsed light amplifier based on optical fiber parametric amplification, and an amplification and performance characterization method.

BACKGROUND

Optical fibers have the characteristics of on-site passive performance, anti-electromagnetic interference, corrosion resistance, strong adaptability to harsh environments, low signal transmission loss, high security in the transmission process, the capability of integrating tens of thousands of sensing units in one optical fiber, and the like, and are especially suitable for long-term uninterrupted monitoring of super-large, long-line structures or facilities, such as high-speed railways, oil and gas pipelines, urban pipeline networks, etc.; and key fields with high requirements for information security and harsh environments, such as defense, military, aerospace and power industry.

In distributed optical fiber sensing, it is not only necessary to measure environmental physical quantities such as temperature, strain and vibration, but also to perform signal positioning. Among them, the most widely used technology is an optical time-domain reflectometry (OTDR) technology which uses pulsed light as the input, and obtains a position of a sensing point by inversion calculation by using a time at which a back-transmitted sensing signal returns to an input terminal, thereby achieving positioning of the sensing signal. Since the sensing signal is generated by input pulsed light, when the optical fiber loss and environmental noise cause pulse power attenuation and extinction ratio reduction after long-distance transmission, a signal-to-noise ratio of the sensing signal will be degraded, resulting in a decrease in the sensing accuracy. Originating from the optical fiber itself, the signal-to-noise ratio of the sensing signal can be increased by enhancing the scattering efficiency. However, enhanced scattering will inevitably lead to an increase in optical fiber transmission loss, limiting an optical fiber transmission distance. The signal-to-noise ratio of the sensing signal can also be increased by using an optical fiber grating to enhance the signal reflectivity. However, such methods also cause signal crosstalk and limit the transmission distance. Another method is used to increase a signal-to-noise ratio by increasing an extinction ratio of input pulses, which mainly depends on an optical modulator or a multi-level optical modulator with a higher extinction ratio. This method has the main defects of complex system and high energy consumption, and cannot fundamentally solve the problems of power attenuation and extinction ratio reduction caused by optical fiber transmission. A third method is to carry out distributed amplification, which realizes the amplification of a sensing pulse by using the amplification produced by a nonlinear scattering effect of an optical fiber, including stimulated Brillouin scattering and stimulated Raman scattering. This method has a notable signal amplification effect, not only amplifies the pulse itself, but also amplifies an area where there should be no light in a non-pulse duration interval, but actually weak light leakage appears, resulting in a decrease in a pulse extinction ratio, which eventually leads to the signal-to-noise reduction of a sensing signal. It can be seen that none of the existing methods can achieve the effect of performing distributed amplification on the pulse power and the extinction ratio at the same time.

SUMMARY

Objects of the present invention are to provide a distributed pulsed light amplifier based on optical fiber parametric amplification, and an amplification and performance characterization method. According to the present invention, high-power pulsed light is used as pump light to generate an optical fiber parametric amplification effect near a zero-dispersion wavelength of an optical fiber, thereby amplifying a power of another sensing pulsed light. Meanwhile, due to the fact that effective optical fiber parametric amplification cannot be achieved through low-power light leakage outside a duration interval of the pump pulsed light, leaked light from the sensing pulsed light cannot be amplified, and thus the effect of amplifying a pulse extinction ratio can be achieved at the same time.

In order to fulfill said objects, the present invention designs a distributed pulsed light amplifier based on optical fiber parametric amplification, comprising a pump pulsed light source, a sensing pulsed light source, a synchronization device, a two-in-one optical coupler, an optical circulator, a parametric amplification optical fiber, a first optical filter, a photoelectric detector and a signal acquisition device, wherein outputs of the pump pulsed light source and the sensing pulsed light source are combined through the two-in-one optical coupler and then enter a first communication terminal of the optical circulator, and are output by a second communication terminal of the optical circulator and then enter the parametric amplification optical fiber; the synchronization device is used to ensure that pump pulsed light output by the pump pulsed light source and sensing pulsed light output by the sensing pulsed light source are synchronized in pulse time; the signal acquisition device is used for acquiring a pulse synchronization trigger signal for the synchronization device; a Rayleigh scattering effect in the parametric amplification optical fiber causes the pump pulsed light and the sensing pulsed light to generate scattered light in a direction opposite to a pulse transmission direction; the scattered light in the direction opposite to the pulse transmission direction is input by the second communication terminal of the optical circulator and then output by a third communication terminal of the optical circulator, and only retains a sensing pulse scattered light signal after passing through the first optical filter; the photoelectric detector is used for performing photoelectric conversion on the sensing pulse scattered light signal; the signal acquisition device is used to acquire an electric signal for the sensing pulse scattered light according to the pulse synchronization trigger signal, and obtain a signal power and a signal-to-noise ratio that vary with the length of the parametric amplification optical fiber according to the electric signal for the sensing pulse scattered light; and by adjusting a pump pulse power and a wavelength of the pump pulsed light source and a sensing pulse power and a wavelength of the sensing pulsed light source, the signal power and the signal-to-noise ratio that vary with the length of the parametric amplification optical fiber can both reach corresponding preset values of the signal power and the signal-to-noise ratio.

The present invention has the following beneficial effects:

1, the distributed pulse amplifier based on optical fiber parametric amplification proposed by the present invention only amplifies a pulse part of the sensing pulsed light, rather than a low optical power part outside a pulse duration interval, and thus can amplify a power and an extinction ratio of a sensing pulse at the same time, and hence can effectively alleviate the power loss and extinction ration reduction of the sensing pulsed light caused by long-distance optical fiber transmission when applied to an OTDR-based distributed sensing system for sensing signal positioning, thereby achieving the purpose of increasing a signal-to-noise ratio of a remote sensing signal in long-distance distributed optical fiber sensing;

2, the pump pulsed light and the signal pulsed light used in the present invention are in the same wavelength band, so the walk-away degree of the pump pulsed light and the sensing pulsed light caused by chromatic dispersion in the long-distance optical fiber transmission will be significantly smaller than that of the distributed Raman amplification (in distributed first-order Raman amplification, there is a wavelength difference of about 100 nm between the pump pulsed light and the sensing pulsed light); and 3, when the present invention is applied to a 1550 nm wavelength band, it can ensure that both the pump pulsed light and the signal pulsed light have low transmission loss, which is obviously superior to that of distributed Raman amplification (when the sensing pulsed light is set at the 1550 nm wavelength band, a center wavelength of Raman pump light is about 1450 nm, and the transmission loss of a quartz optical fiber is significantly higher than that at the 1550 nm wavelength band)

DETAILED DESCRIPTION OF THE EMBODIMENTS

The present invention will be further described below in conjunction with the accompanying drawings and specific embodiments.

Figure 1:
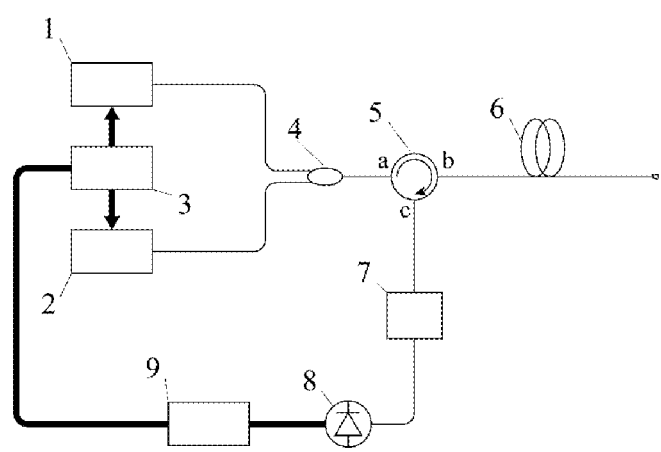
FIG. 1 is a schematic structural diagram of the present invention.

A distributed pulsed light amplifier based on optical fiber parametric amplification as designed by the present invention, as shown in FIG. 1, includes a pump pulsed light source 1, a sensing pulsed light source 2, a synchronization device 3, a two-in-one optical coupler 4, an optical circulator 5, a parametric amplification optical fiber 6, a first optical filter 7, a photoelectric detector 8 and a signal acquisition device 9, wherein outputs of the pump pulsed light source 1 and the sensing pulsed light source 2 are combined through the two-in-one optical coupler 4 and then enter a first communication terminal (Port a) of the optical circulator 5, and are output by a second communication terminal (Port b) of the optical circulator 5 and then enter the parametric amplification optical fiber 6; the synchronization device 3 is used to ensure that pump pulsed light output by the pump pulsed light source 1 and sensing pulsed light output by the sensing pulsed light source 2 are synchronized in pulse time (aligned centrally in pulse time (that is, repetition frequencies of a pumping pulse and a sensing pulse are identical, and there is always overlap in time), wherein the designed pumping pulse is longer than the sensing pulse in consideration of chromatic dispersion in the optical fiber transmission, so as to ensure there is no deviation in two time after long-distance transmission); the signal acquisition device 9 is used for acquiring a pulse synchronization trigger signal for the synchronization device 3; a Rayleigh scattering effect in the parametric amplification optical fiber 6 causes the pump pulsed light and the sensing pulsed light to generate scattered light in a direction opposite to a pulse transmission direction; the scattered light in the direction opposite to the pulse transmission direction is input through the second communication terminal of the optical circulator 5 and then output by a third communication terminal (Port c) of the optical circulator 5, and only retains a sensing pulse scattered light signal after passing through the first optical filter 7 (a bandpass optical filter); the photoelectric detector 8 is used for performing photoelectric conversion on the sensing pulse scattered light signal; the signal acquisition device 9 is used to acquire an electric signal for a sensing pulse scattered light according to the pulse synchronization trigger signal (determining a time interval for signal acquisition according to a time corresponding to pulses, and triggering the acquisition synchronously), and obtain a signal power and a signal-to-noise ratio that vary with the length of the parametric amplification optical fiber 6 according to the electric signal for the sensing pulse scattered light; and by adjusting a pump pulse power and a wavelength of the pump pulsed light source 1 and a sensing pulse power and a wavelength of the sensing pulsed light source 2, the signal power and the signal-to-noise ratio that vary with the length of the parametric amplification optical fiber 6 can both reach corresponding preset values of the signal power and the signal-to-noise ratio.

In the above technical solution, the signal acquisition device 9 is used to calculate the signal power that varies with the length of the parametric amplification optical fiber 6 according to a time-domain variation of the electric signal for the sensing pulse scattered light and in combination with a light velocity in the parametric amplification optical fiber 6, and then calculate the signal-to-noise ratio that varies with the length of the parametric amplification optical fiber 6 in combination with a system (i.e., the amplifier in the present invention) background noise.

Figure 2:
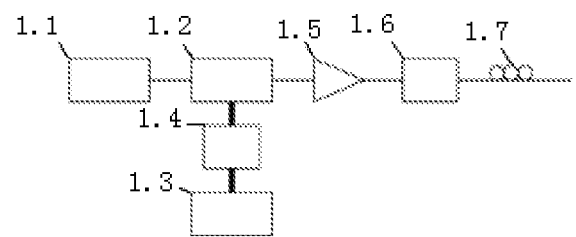
FIG. 2 is a schematic structural diagram of a pump pulsed light source in the present invention.

In the above technical solution, as shown in FIG. 2, the pump pulsed light source 1 includes a first laser 1.1, a first light intensity modulator 1.2, a first electrical pulse source 1.3, a first electrical amplifier 1.4, an optical amplifier 1.5, a second optical filter 1.6 and a polarization controller 1.7, wherein a laser signal output terminal of the first laser 1.1 is connected to an optical signal input terminal of the first light intensity modulator 1.2; an electrical pulse signal output terminal of the first electrical pulse source 1.3 is connected to an electrical signal input terminal of the first light intensity modulator 1.2 through the first electrical amplifier 1.4; the first light intensity modulator 1.2 is used to perform light intensity modulation on a laser signal by using an electrical pulse signal, and convert a laser signal of continuous waves into a pulsed light signal; a pulse width is determined by the electrical pulse signal applied to the first light intensity modulator 1.2; and the pulsed light signal passes through the optical amplifier 1.5, the second optical filter 1.6 and the polarization controller 1.7 in sequence to form a pump pulsed light signal.

In the above technical solution, the first electrical pulse source 1.3 is used to receive a synchronization control signal sent by the synchronization device 3.

Figure 3:
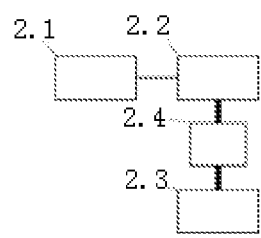
FIG. 3 is a schematic structural diagram of a sensing pulsed light source in the present invention.

In the above technical solution, as shown in FIG. 3, the sensing pulsed light source 2 includes a second laser 2.1, a second light intensity modulator 2.2, a second electrical pulse source 2.3 and a second electrical amplifier 2.4, wherein a laser signal output terminal of the second laser 2.1 is connected to an optical signal input terminal of the second light intensity modulator 2.2; an electrical pulse signal output terminal of the second electrical pulse source 2.3 is connected to an electrical signal input terminal of the second light intensity modulator 2.2 through the second electrical amplifier 2.4; and the second light intensity modulator 2.2 is used to perform light intensity modulation on a laser signal by using an electrical pulse signal to form a sensing pulsed light signal.

In the above technical solution, the second electrical pulse source 2.3 is used to receive a synchronization control signal sent by the synchronization device 3.

In the parametric amplification optical fiber 6, the pump pulsed light transmits energy to the sensing pulsed light through the optical fiber parametric amplification process, so as to realize distributed light parametric amplification of the sensing pulsed light. To ensure the effectiveness of optical fiber parametric amplification, a zero-dispersion wavelength of the optical fiber should be close to and slightly smaller than the center wavelength of the pump pulsed light (usually 1 to 5 nm smaller than the pump wavelength). In order to achieve a large effective amplification distance, the transmission loss of the optical fiber subjected to parametric amplification should be as small as possible, which is preferably not higher than the transmission loss of the existing communication optical fiber.

At the same time as the parametric amplification process occurs, the Rayleigh scattering effect in the parametric amplification optical fiber 6 causes the pump pulsed light and the sensing pulsed light to generate back-transmitted scattered light, wherein a sensing pulse back-scattered light signal is a distributed optical fiber sensing signal subjected to distributed light amplification.

The first optical filter 7 is used to obtain the distributed optical fiber sensing signal subjected to distributed light amplification, which has a center wavelength of $\lambda_s$, and a passband range that should ensure that a sensing pulsed light scattering signal is retained, and a pump pulsed light scattering signal is completely filtered out.

The principle of using optical fiber parametric amplification to realize distributed light amplification of a sensing signal, and the specific process of characterization of distributed light amplification performance are as follows.

When the pump pulsed light and the sensing pulsed light in the above system enter a high nonlinear optical fiber at the same time, and the pump pulsed light and the sensing pulsed light are synchronized in time, the optical fiber parametric amplification occurs, the energy of the pump pulsed light is transferred to the sensing pulsed light to amplify the sensing pulsed light, and at the same time, idler-frequency pulse light having a wavelength of $\lambda_I$ is generated, with a center wavelength is $\lambda_I = \lambda_P - \lambda_S$. Under the premise that the power of the sensing pulsed light is relatively low, and thus a high-order four-wave mixing product can be ignored, the variations in power and relative phase difference of the pump pulsed light, the sensing pulsed light and the idler-frequency pulsed light as a function of the optical fiber length Z are given by the following set of coupled wave equations:

$$\frac{dP_P}{dz} = -4\gamma(P_P^2 P_S P_I)^{\frac{1}{2}} \sin\theta \tag{1}$$

$$\frac{dP_S}{dz} = 2\gamma(P_P^2 P_S P_I)^{1/2} \sin\theta \tag{2}$$

$$\frac{dP_I}{dz} = 2\gamma(P_P^2 P_S P_I)^{1/2} \sin\theta \tag{3}$$

$$\frac{d\theta}{dz} = \Delta\beta + \gamma(2P_P - P_S - P_I) + \gamma\left[(P_P^2 P_I / P_S)^{1/2} + (P_P^2 P_I / P_S)^{1/2} - 4(P_S P_I)^{1/2}\right]\cos\theta \tag{4}$$

in which $P_P$, $P_S$ and $P_I$ are the powers of the pump pulsed light, the sensing pulsed light and the idler-frequency pulsed light; $\gamma$ is a non-linear coefficient of the optical fiber; $\theta$ is a relative phase difference; z represents the length of the parametric amplification optical fiber and is given by:

$$\theta(z) = \Delta\beta z + 2\phi_P(z) - \phi_S(z) - \phi_I(z) \tag{5}$$

in which, $\Delta\beta$ a chromatic-dispersion-induced linear phase mismatch, which is given by:

$$\Delta\beta = \left\{\beta_3(\omega_P - \omega_0) + \frac{\beta_4}{2}\left[(\omega_P - \omega_0)^2 + \frac{1}{6}(\omega_P - \omega_S)^2\right]\right\}(\omega_P - \omega_S)^2 \tag{6}$$

in which, $\beta_3$ and $\beta_4$ are third-order and fourth-order derivatives of a propagation constant $\beta(\omega)$ at a zero-dispersion circular frequency $\omega_0$, respectively. Since the effect of higher-order chromatic dispersion can be ignored, only the effects of $\beta_3$ and $\beta_4$ on the linear phase mismatch are considered here. $\varphi_P(z)$, $\varphi_S(z)$ and $\varphi_I(z)$ are phases of the pump pulsed light, the sensing pulsed light and the idler-frequency pulsed light respectively, which are given by their respective initial phases together with the nonlinear phase shift produced by the transmission process; $\theta(z)$ represents the variation in relative phase difference (the relative phase relationship among the pump light, the sensing light and the idler-frequency light) with a transmission distance of light in the parametric amplification optical fiber; and $\omega_P$ and $\omega_S$ are circular frequencies of the pump pulsed light and the sensing pulsed light respectively.

When the amplifier works under a condition of phase matching, i.e., $\theta(z) \approx \pi/2$, the third term on the right side of the equal sign in Equation (4) can be ignored. At this time, then:

$$\frac{d\theta}{dz} \approx \Delta\beta + \gamma(2P_P - P_S - P_I) \tag{7}$$

wherein the second term is a phase adaptation term caused by the nonlinear phase shift in the transmission process. In a shorter optical fiber, the optical fiber parameter amplifier works in a pumped non-depleted mode ($P_P \gg P_S$), then Equation (6) can be simplified as:

$$\frac{d\theta}{dz} \approx \Delta\beta + 2\gamma P_P = \kappa \tag{8}$$

wherein κ is a phase mismatch parameter, and the variations of the powers of the sensing pulsed light and the idler-frequency pulsed light with the length of the optical fiber are given by Equations (9) and (10):

$$P_S(z) = P_S(0)\left\{1 + \left[\frac{\gamma P_P}{g}\sinh(gL)\right]^2\right\} \quad (9)$$

$$P_I(z) = P_S(0)\left[\frac{\gamma P_P}{g}\sinh(gL)\right]^2 \quad (10)$$

in which, $P_S(z)$ represents the variation of the power of the sensing pulsed light with the length of the optical fiber; $P_S(0)$ represents the power of the input sensing pulsed light; $P_I(z)$ represents the variation of the power of the idler-frequency pulsed light with the length of the optical fiber; sin h is a hyperbolic sine function; and a parameter gain coefficient g is given by:

$$g^2 = [(\gamma P_P)^2 - (\kappa/2)^2] = -\Delta\beta\left(\frac{\Delta\beta}{4} + \gamma P_P\right) \quad (11)$$

in which, L is an effective length of the optical fiber subjected to the parametric amplification. In the case of considering that the optical fiber has no transmission loss, L=z. In the case that the optical fiber has transmission loss, then:

$$L = \frac{1 - \exp(-\alpha z)}{\alpha} \quad (12)$$

in which α is a linear attenuation coefficient of the optical fiber.

When the non-depletion assumption of the pump pulsed light is set up, the power of the sensing pulsed light can be calculated according to Formula (10) and the input optical power $P_S(0)$ of the sensing pulsed light. When the non-depletion assumption of the pump pulsed light cannot be set up due to the transmission loss and the transfer of the power to the sensing pulsed light and the idler-frequency pulsed light, the power of the sensing pulsed light needs to be calculated by solving Equations sets (1) to (4). These calculation methods can provide a basis for adjusting the center wavelength and power of the pump light in the following steps.

A pulsed light amplification method based on the amplifier includes the following steps:

A. emitting pump pulsed light with a center wavelength of $\lambda_P$ by a pump pulsed light source 1;

B. emitting sensing pulsed light with a center wavelength of $\lambda_S$ by a sensing pulsed light source 2, wherein the pump pulsed light has a pulse width greater than the sensing pulsed light, the polarization of the pump pulsed light is identical with that of the sensing pulsed light, and the center length $\lambda_S$ is tuned within an amplifier gain spectrum range, i.e., within a range from $\lambda_{S,start}$ to $\lambda_{S,stop}$, wherein the wavelength is set first as $\lambda_{S,start}$;

C. combining the amplified pump pulsed light and sensing pulsed light by a two-in-one optical coupler 4, and ensuring that the pump pulsed light and the sensing pulsed light are synchronized in pulse time by a synchronization device 3; and D inputting the time-synchronized pump pulsed light and sensing pulsed light by a first communication terminal of an optical circulator 5, and outputting the same by a second communication terminal of the optical circulator 5 and then entering a parametric amplification optical fiber 6, wherein a distributed optical fiber parameter process occurs in the optical fiber transmission process, the pump pulsed light is consumed and the sensing pulsed light is amplified, and meanwhile, idler-frequency pulsed light having a center wavelength of $1/\lambda_I = 2/\lambda_P - 1/\lambda_S$ is generated to realize the amplification of the sensing pulsed light.

An amplifier performance characterization method using the above-mentioned pulsed light amplification method includes the following steps:

A. causing pump pulsed light and sensing pulsed light to generate scattered light in a direction opposite to a pulse transmission direction by using a Rayleigh scattering effect in a parametric amplification optical fiber 6; inputting the scattered light in the direction opposite to the pulse transmission direction through a second communication terminal of an optical circulator 5 and then outputting the same by a third communication terminal of the optical circulator 5; filtering the scattered light in the direction opposite to the pulse transmission direction by a first optical filter 7 to remove a scattered signal derived from the pump pulsed light and the idler-frequency pulsed light, thereby obtaining a scattered light signal derived from the sensing pulsed light; converting the scattered light signal into an electric signal by a photoelectric detector 8, and acquiring the electric signal by a signal acquisition device 9;

B. turning off a pump pulsed light source 1; obtaining variations of a power and a signal-to-noise ration of the scattered signal for the sensing pulsed light with the length of an parametric amplification optical fiber 6 by inversion calculation at a wavelength $\lambda_{S,start}$, according to a time-domain electrical signal acquired by the signal acquisition device 9, denoted as $P_{off,RS}(\lambda_{S,start},z)$ and $SNR_{off,RS}(\lambda_{S,start},z)$, respectively, wherein z represents the length of the parametric amplification optical fiber 6;

C. gradually tuning the center wavelength of the sensing pulsed light by taking the wavelength $\lambda_{S,step}$ as an interval (the setting of the wavelength interval is related to the actual fineness of the gain spectrum measurement, which may usually be set at 0.1 nm); repeating the step 102, till the length reaches) $\lambda_{S,stop}$; obtaining variations of the power and the signal-to-noise ratio of the scattered signal for the sensing pulsed light with the length of the parametric amplification optical fiber 6 and the center wavelength of the sensing pulsed light when the pumping pulsed light source 1 turned off, denoted as $P_{off,RS}(\lambda_S,z)$ and $SNR_{off,RS}(\lambda_S,z)$;

D. turning on the pump pulsed light source 1; obtaining variations of the power and the signal-to-noise ratio of the scattered signal for the sensing pulsed light with the length of the parametric amplification optical fiber 6 by inversion calculation at a wavelength $\lambda_{S,start}$ under the conditions of the current center wavelength and power of the pump pulsed light source, according to a time-domain electrical signal acquired by the signal acquisition device 9, denoted as $P_{on,RS}(\lambda_{S,start},z)$ and $SNR_{on,RS}(\pi_{S,start},z)$ respectively;

E. gradually tuning the center wavelength of the sensing pulsed light by taking the wavelength $\lambda_{S,step}$ as an interval; repeating the step 104, till the length reaches) $\lambda_{S,stop}$; Obtaining Variations of the Power and the Signal-to-Noise ratio of the scattered signal of the sensing pulsed light with the length of the parametric amplification optical fiber 6 and the center wavelength of the sensing pulsed light under the conditions of the center wavelength and power of the current pump pulsed light source, denoted as $P_{on,RS}(\lambda_S,z)$ and $SNR_{on,RS}(\lambda_S,z)$;

F. calculating variations of a gain spectrum and a noise index spectrum with the length of the parameter amplifier fiber 6, that is, a spatially resolved gain spectrum and a noise index spectrum: $G(\lambda_S,z)=P_{on,RS}(\lambda_S,z)-P_{off,RS}(\lambda_S,z)$, $NF(\lambda_S,z)=SNR_{on,RS}(\lambda_S,z)-SNR_{off,RS}(\lambda_S,z)$; and G. adjusting center wavelength and power settings of the pump pulsed light according to the requirements for the gain spectrum and the noise index spectrum, and repeating the steps 104 to 106 until the gain spectrum and the noise spectrum meet design requirements.

The content that has not been described in detail in this specification belongs to the prior art known to those skilled in the art.

What is claimed is:

1. A distributed pulsed light amplifier based on optical fiber parametric amplification comprising
   a pump pulsed light source (1),
   a sensing pulsed light source (2),
   a synchronization device (3),
   a two-in-one optical coupler (4),
   an optical circulator (5),
   a parametric amplification optical fiber (6),
   a first optical filter (7),
   a photoelectric detector (8) and a signal acquisition device (9),
   wherein outputs of the pump pulsed light source (1) and the sensing pulsed light source (2) are combined through the two-in-one optical coupler (4) and then enter a first communication terminal of the optical circulator (5), and are output by a second communication terminal of the optical circulator (5) and then enter the parametric amplification optical fiber (6);
   the synchronization device (3) is used to ensure that pump pulsed light output by the pump pulsed light source (1) and sensing pulsed light output by the sensing pulsed light source (2) are synchronized in pulse time; the signal acquisition device (9) is used for acquiring a pulse synchronization trigger signal for the synchronization device (3);
   a Rayleigh scattering effect in the parametric amplification optical fiber (6) causes the pump pulsed light and the sensing pulsed light to generate scattered light in a direction opposite to a pulse transmission direction;
   the scattered light in the direction opposite to the pulse transmission direction is input by the second communication terminal of the optical circulator (5) and then output by a third communication terminal of the optical circulator (5), and only retains a sensing pulse scattered light signal after passing through the first optical filter (7);
   the photoelectric detector (8) is used for performing photoelectric conversion on the sensing pulse scattered light signal;
   the signal acquisition device (9) is used to acquire an electric signal for the sensing pulse scattered light according to the pulse synchronization trigger signal, and obtain a signal power and a signal-to-noise ratio that vary with the length of the parametric amplification optical fiber (6) according to the electric signal for the sensing pulse scattered light; and by adjusting a pump pulse power and a wavelength of the pump pulsed light source (1) and a sensing pulse power and a wavelength of the sensing pulsed light source (2), the signal power and the signal-to-noise ratio that vary with the length of the parametric amplification optical fiber (6) can both reach corresponding preset values of the signal power and the signal-to-noise ratio; and wherein the distributed pulsed light amplifier is configured to perform an amplifier performance characterization method using a pulsed light amplification method, comprising the following steps:

A. causing pump pulsed light and sensing pulsed light to generate scattered light in a direction opposite to a pulse transmission direction by using a Rayleigh scattering effect in a parameter amplifier optical fiber (6); inputting the scattered light in the direction opposite to the pulse transmission direction by a second communication terminal of an optical circulator (5) and then outputting the same by a third communication terminal of the optical circulator (5); filtering the scattered light in the direction opposite to the pulse transmission direction by a first optical filter (7) to remove a scattered signal derived from the pump pulsed light and the idler-frequency pulsed light, thereby obtaining a scattered light signal derived from the sensing pulsed light; converting the scattered light signal into an electric signal by a photoelectric detector (8), and acquiring the electric signal by a signal acquisition device (9);

B. turning off a pump pulsed light source (1); obtaining variations of a power and a signal-to-noise ratio of the scattered signal for the sensing pulsed light with the length of an parametric amplification optical fiber (6) by inversion calculation at a wavelength of $\lambda_{S,start}$, according to a time-domain electrical signal acquired by the signal acquisition device (9), denoted as $P_{off,RS}(\lambda_{S,start},z)$ and $SNR_{off,RS}(\lambda_{S,start},z)$, respectively, wherein z represents the length of the parametric amplification optical fiber (6);

C. gradually tuning the center wavelength of the sensing pulsed light by taking the wavelength $\lambda_{S,step}$ as an interval; repeating the step B, till the length reaches $\lambda_{S,stop}$; obtaining variations of the power and the signal-to-noise ratio of the scattered signal for the sensing pulsed light with the length of the parametric amplification optical fiber (6) and the center wavelength of the sensing pulsed light when the pumping pulsed light source (1) turned off, denoted as $P_{off,RS}(\lambda_S,z)$ and $SNR_{off,RS}(\lambda_S,z)$;

D. turning on a pump pulsed light source (1); obtaining variations of the power and the signal-to-noise ratio of the scattered signal for the sensing pulsed light with the length of the parametric amplification optical fiber (6) by inversion calculation at a wavelength of $\lambda_{S,start}$ under the conditions of the current center wavelength and power of the pump pulsed light source, according to a time-domain electrical signal acquired by the signal acquisition device (9), denoted as $P_{on,RS}(\lambda_{S,start},z)$ and $SNR_{on,RS}(\lambda_{S,start},z)$, respectively;

E. gradually tuning the center wavelength of the sensing pulsed light by taking the wavelength $\lambda_{S,step}$ as an interval; repeating the step D, till the length reaches $\lambda_{S,stop}$; obtaining variations of the power and the signal-to-noise ratio of the scattered signal for the sensing pulsed light with the length of the optical fiber (6) and the center wavelength of the sensing pulsed light under the conditions of the current center wavelength and power of the pump pulsed light source, denoted as $P_{on,RS}(\lambda_S,z)$ and $SNR_{on,RS}(\lambda_S,z)$;

F. calculating variations of a gain spectrum and a noise index spectrum with the length of the parametric amplifier fiber (6), that is, a spatially resolved gain spectrum and a noise index spectrum: $G(\lambda_S,z)=P_{on,RS}(\lambda_S,z)-P_{off,RS}(\lambda_S,z)$, $NF(\lambda_S,z)=SNR_{on,RS}(\lambda_S,z)-SNR_{off,RS}(\lambda_S,z)$; and G. adjusting center wavelength and power settings of the pump pulsed light according to the requirements for the gain spectrum and the noise index spectrum, and repeating the steps (D) to (F) until the gain spectrum and the noise spectrum meet design requirements.

2. The distributed pulsed light amplifier based on optical fiber parametric amplification according to claim 1, wherein the signal acquisition device (9) is used to calculate the signal power that varies with the length of the parametric amplification optical fiber (6) according to a time-domain change of the electric signal for the sensing pulse scattered light and in combination with a light velocity in the parametric amplification optical fiber (6), and then calculate the signal-to-noise ratio that varies with the length of the parametric amplification optical fiber (6) in combination with a system background noise.

3. The distributed pulsed light amplifier based on optical fiber parametric according to claim 1, wherein the pump pulsed light source (1) comprises a first laser (1.1), a first light intensity modulator (1.2), a first electrical pulse source (1.3), a first electrical amplifier (1.4), an optical amplifier (1.5), a second optical filter (1.6) and a polarization controller (1.7), wherein a laser signal output terminal of the first laser (1.1) is connected to an optical signal input terminal of the first light intensity modulator (1.2); an electrical pulse signal output terminal of the first electrical pulse source (1.3) is connected to an electrical signal input terminal of the first light intensity modulator (1.2) through the first electrical amplifier (1.4); the first light intensity modulator (1.2) is used to perform light intensity modulation on a laser signal by using an electrical pulse signal, and convert a laser signal of continuous waves into a pulsed light signal; a pulse width is determined by the electrical pulse signal applied to the first light intensity modulator (1.2); and the pulsed light signal passes through the optical amplifier (1.5), the second optical filter (1.6) and the polarization controller (1.7) in sequence to form a pump pulsed light signal.

4. The distributed pulsed light amplifier based on optical fiber parametric amplification according to claim 3, wherein the first electrical pulse source (1.3) is used to receive a synchronization control signal sent by the synchronization device (3).

5. The distributed pulsed light amplifier based on optical fiber parametric amplification according to claim 1, wherein the sensing pulsed light source (2) comprises a second laser (2.1), a second light intensity modulator (2.2), a second electrical pulse source (2.3) and a second electrical amplifier (2.4), wherein a laser signal output terminal of the second laser (2.1) is connected to an optical signal input terminal of the second light intensity modulator (2.2); an electrical pulse signal output terminal of the second electrical pulse source (2.3) is connected to an electrical signal input terminal of the second light intensity modulator (2.2) through the second electrical amplifier (2.4); and the second light intensity modulator (2.2) is used to perform light intensity modulation on a laser signal by using an electrical pulse signal.

6. The distributed pulsed light amplifier based on optical fiber parametric amplification according to claim 3, wherein the sensing pulsed light source (2) comprises a second laser (2.1), a second light intensity modulator (2.2), a second electrical pulse source (2.3) and a second electrical amplifier (2.4), wherein a laser signal output terminal of the second laser (2.1) is connected to an optical signal input terminal of the second light intensity modulator (2.2); an electrical pulse signal output terminal of the second electrical pulse source (2.3) is connected to an electrical signal input terminal of the second light intensity modulator (2.2) through the second electrical amplifier (2.4); and the second light intensity modulator (2.2) is used to perform light intensity modulation on a laser signal by using an electrical pulse signal.

7. The distributed pulsed light amplifier based on optical fiber parametric amplification according to claim 5, wherein the second electrical pulse source (2.3) is used to receive a synchronization control signal sent by the synchronization device (3).

8. The distributed pulsed light amplifier based on optical fiber parametric amplification according to claim 1, performing the pulsed light amplification method, comprising the following steps:

A. emitting pump pulsed light with a center wavelength of $\lambda_S$ by a pump pulsed light source (1);

B. emitting sensing pulsed light with a center wavelength of $\lambda_S$ by a sensing pulsed light source (2), wherein the pump pulsed light has a pulse width greater than the sensing pulsed light, the polarization of the pump pulsed light is identical with that of the sensing pulsed light, and the center length $\lambda_S$ is tuned within an amplifier gain spectrum range, i.e., within a range from $\lambda_{S,start}$ to $\lambda_{S,stop}$;

C. combining the amplified pump pulsed light and sensing pulsed light by a two-in-one optical coupler (4), and ensuring that the pump pulsed light and the sensing pulsed light are synchronized in pulse time by a synchronization device (3); and D. inputting the time-synchronized pump pulsed light and sensing pulsed light by a first communication terminal of an optical circulator (5), and outputting the same by a second communication terminal of the optical circulator (5) and then entering a parametric amplification optical fiber (6), wherein a distributed optical fiber parameter process occurs in the optical fiber transmission process, the pump pulsed light is consumed and the sensing pulsed light is amplified, and meanwhile, idler-frequency pulsed light having a center wavelength of $1/\lambda_I=2/\lambda_P-1/\lambda_S$ is generated to realize the amplification of the sensing pulsed light.

\* \* \* \* \*